(12) United States Patent
Cheng et al.

(10) Patent No.: US 8,078,857 B2
(45) Date of Patent: Dec. 13, 2011

(54) METHOD AND SYSTEM FOR MONITORING AND ADAPTIVELY PRE-LOADING CRUCIAL DYNAMIC LINK LIBRARIES

(75) Inventors: Yuan Cheng, Beijing (CN); Hua Feng Hong, Beijing (CN); Min Qu, Beijing (CN); Xing Wei, Beijing (CN); Xiao Bing Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 12/165,886

(22) Filed: Jul. 1, 2008

(65) Prior Publication Data
US 2009/0013163 A1 Jan. 8, 2009

(30) Foreign Application Priority Data
Jul. 2, 2007 (CN) .......................... 2007 1 0127370

(51) Int. Cl.
G06F 9/00 (2006.01)
G06F 9/24 (2006.01)
G06F 15/177 (2006.01)
(52) U.S. Cl. ............................................... 713/1; 713/2
(58) Field of Classification Search ................ 713/1, 2
See application file for complete search history.

(56) References Cited

U.S. PATENT DOCUMENTS

| | | | | |
|---|---|---|---|---|
| 5,673,315 A * | 9/1997 | Wolf | ................................ | 705/59 |
| 6,003,095 A * | 12/1999 | Pekowski et al. | ............. | 717/163 |
| 6,003,115 A * | 12/1999 | Spear et al. | ..................... | 711/137 |
| 6,052,778 A * | 4/2000 | Hagy et al. | .......................... | 713/2 |
| 6,141,698 A | 10/2000 | Krishnan et al. | | |
| 6,349,344 B1 * | 2/2002 | Sauntry et al. | ................. | 719/332 |
| 6,633,968 B2 * | 10/2003 | Zwiegincew et al. | .......... | 711/213 |
| 6,718,543 B2 * | 4/2004 | Arai et al. | ....................... | 717/158 |
| 6,769,126 B1 * | 7/2004 | Pekowski | ........................ | 719/331 |
| 6,854,009 B1 * | 2/2005 | Hughes | ........................... | 709/220 |
| 7,016,911 B2 * | 3/2006 | Bousfield et al. | ............. | 707/702 |
| 7,281,238 B2 * | 10/2007 | Sasaki et al. | ................... | 717/127 |
| 7,650,531 B2 * | 1/2010 | Yeung et al. | .................... | 714/5.1 |
| 2006/0026584 A1 | 2/2006 | Muratori et al. | | |

(Continued)

FOREIGN PATENT DOCUMENTS
EP    0 738 966 A2    10/1996
(Continued)

OTHER PUBLICATIONS

"JSKYs XP & Vista Support: Prefetch Files", Feb. 16, 2006, rushmore.com, retrieved from the Internet on Apr. 5, 2011 at http://members.rushmore.com/~jsky/id14.html, pp. 1-3.*
Beazley, D.M.; Ward, B.D.; Cooke, I.R.; , "The inside story on shared libraries and dynamic loading," Computing in Science & Engineering , vol. 3, No. 5, pp. 90-97, Sep./Oct. 2001.*

(Continued)

Primary Examiner — Faisal M Zaman
(74) Attorney, Agent, or Firm — Andrea Bauer; Hoffman Warnick LLC

(57) ABSTRACT

The invention provides a system and method for adaptively loading frequently loaded dynamic link libraries. The system comprises: a monitor for monitoring loading events of dynamic link libraries while an operating system is running, and logging a name and related loading information of the corresponding dynamic link library into a log file in response to the loading events; and an invoker for automatically loading at least one of the most frequently loaded dynamic link libraries logged in the log file upon a subsequent startup of the operating system. By using the system and method, startup performance of the most frequently used applications can be greatly improved.

9 Claims, 4 Drawing Sheets

U.S. PATENT DOCUMENTS

| | | | |
|---|---|---|---|
| 2006/0116864 A1 | | 6/2006 | McHugh et al. |
| 2009/0282230 A1* | | 11/2009 | Vaidyanathan et al. .......... 713/1 |
| 2010/0057905 A1* | | 3/2010 | Enscoe et al. ................ 709/224 |
| 2011/0125638 A1* | | 5/2011 | Davis et al. .................... 705/41 |

FOREIGN PATENT DOCUMENTS

| | | | | |
|---|---|---|---|---|
| JP | 2001142710 | A | | 5/2001 |
| JP | 2006260290 | A | * | 9/2006 |
| JP | 2007164679 | A | * | 6/2007 |
| JP | 2008123139 | A | * | 5/2008 |

OTHER PUBLICATIONS

Heeseung Jo; Hwanju Kim; Jinkyu Jeong; Joonwon Lee; Seungryoul Maeng; , "Optimizing the startup time of embedded systems: a case study of digital TV," Consumer Electronics, IEEE Transactions on , vol. 55, No. 4, pp. 2242-2247, Nov. 2009.*

Cernuda del Rio, A., "LoadSpy: Profiling Program Loading", Windows Developers Journal, vol. 12, No 2, Feb. 2001.

China Patent Office, Office Action dated Aug. 20, 2010, Untranslated copy provided, 4 pages.

* cited by examiner

METHOD AND SYSTEM FOR MONITORING AND ADAPTIVELY PRE-LOADING CRUCIAL DYNAMIC LINK LIBRARIES

CROSS-REFERENCE TO RELATED APPLICATIONS

This application claims the benefit of co-pending Chinese Patent Application No. 200710127370.1, filed 2 Jul. 2007, which is incorporated herein by reference.

FIELD OF THE INVENTION

The present invention generally relates to a method and system for pre-loading crucial dynamic link libraries, and particularly, to a method and system for adaptively pre-loading frequently loaded dynamic link libraries upon the start up of an operating system.

RELATED ART

The startup performance of applications gets poorer and poorer as applications get more and more complicated (e.g., applications containing a large number of dynamic link libraries). For instance, applications with more than one hundred dynamic link library files (*.dll files) are not uncommon. As is known to all, since applications have to load their dynamic link libraries upon startup, for an application with many dynamic link libraries, loading dynamic link libraries impacts heavily on its startup performance.

For an individual user, there is indeed a serious demand for acceptable startup performance of favorite applications (usually also the most frequently used applications) in the system to improve user experience. It is desired that such favorite applications will have good startup performance, even though they have a large amount of accompanied dynamic link libraries which may influence the startup performance.

A known solution to this problem is the "service" feature of the operating system. Through this feature the operating system provides a mechanism for the user's favorite applications to be registered as "service" programs which are launched automatically once the operating system starts up. Since these "service" programs already run in background after the startup of the operating system, whenever the user needs one of these applications to perform a task, that application can promptly show up and perform the task. This undoubtedly enhances user experience.

This approach, however, has its own drawbacks. For example, it has poor adaptability due to the fact that users' favorite applications (i.e., the most frequently used applications) seldom remain the same. Further, users seldom unregister the "service" programs which no longer belong to the frequently used ones from the "service" list. In addition, as a user registers more and more "service" programs, the user will soon find his "service" list bloats and startup performance of the operating system degrades. At the same time, the "service" list becomes another system management headache. Furthermore, since the "service" programs will run all along since operating system startup, there is an obvious system runtime resource (primarily memory and CPU resource) penalty proportional to the amount of the quantity and size of the "service" programs regarding that most of them are not used by the user most of the time.

SUMMARY OF THE INVENTION

The present invention aims to achieve startup performance improvement goal while eliminating the drawbacks introduced by the "service" mechanism.

The core idea of the invention can be summarized as: while the operating system runs, the load frequency of each dynamic link library is monitored and logged into a log file. The next time operating system starts up, the most frequently loaded one or more dynamic link library (libraries) in the log file is automatically loaded. When the most frequently used applications are really launched as user uses them, they can start up quickly because most of their dynamic link libraries have already been loaded in advance.

The present invention is conceived based on the following three facts:
1) The loading of dynamic link libraries impacts heavily on the startup performance of an application;
2) Once a dynamic link library has been loaded, the time taken by the subsequent loading of that dynamic link library is trivial compared to that taken when it is loaded for the first time due to characteristics of the cache (i.e., many read requests caused by subsequent loading of a loaded dynamic link library can be satisfied by the cache, which means those read requests get their data from high-speed cache device rather than from slow-speed hard disk);
3) The dynamic link libraries of most frequently used applications are also the most frequently loaded dynamic link libraries.

According to an aspect of the present invention, there is provided a system for adaptively loading frequently loaded dynamic link libraries, comprising: a monitor for monitoring loading events of dynamic link libraries while an operating system is running, and for logging a name and related loading information of each dynamic link library into a log file in response to the loading events; and an invoker for automatically loading at least one of the most frequently loaded dynamic link libraries logged in the log file upon a subsequent startup of the operating system.

According to another aspect of the present invention, there is provided a method for adaptively loading frequently loaded dynamic link libraries, comprising: monitoring loading events of dynamic link libraries while an operating system is running; logging a name and related loading information of each dynamic link library into a log file in response to the loading events; and automatically loading at least one of the most frequently loaded dynamic link libraries logged in the log file upon a subsequent startup of the operating system.

BRIEF DESCRIPTION OF THE DRAWINGS

The above and other objects, features and advantages of the present invention will become more apparent and readily understood from the following detailed description to embodiment thereof when taken in conjunction with the accompanying drawings.

DETAILED DESCRIPTION OF THE INVENTION

Figure 1:
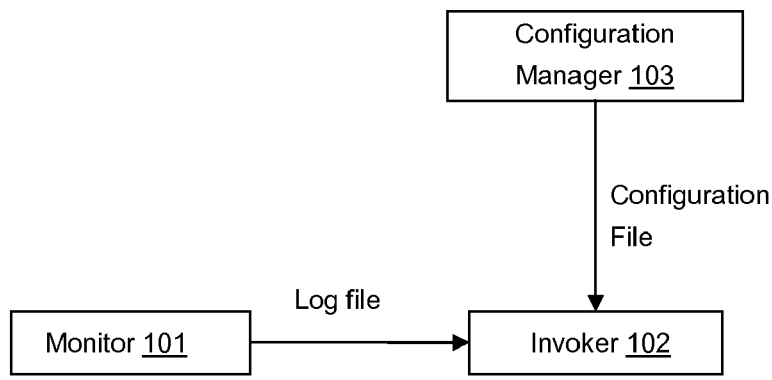
FIG. 1 is a block diagram illustrating a pre-loading system for adaptively pre-loading frequently-loaded dynamic link libraries according to an embodiment of the present invention.

Exemplary embodiments of the present invention will now be described herein with reference to the accompanying drawings. In the drawings of the present invention, the same reference numerals represent the same elements.

FIG. 1 is a block diagram illustrating a pre-loading system for adaptively pre-loading frequently-loaded dynamic link libraries according to an embodiment of the present invention.

Referring to FIG. 1, the pre-loading system includes monitor 101 and invoker 102. In addition, the pre-loading system further optionally includes a configuration manager 103.

As known, applications have to load their dynamic link libraries into memory upon startup. Therefore, the monitor 101 monitors system-wide loading events of every dynamic link library during the running of the system, so as to acquire the loading conditions of the dynamic link libraries. Whenever the application starts and requires the loading of a dynamic link library, the monitor 101 will monitor this request, and log information relating to the loading event of the dynamic link library, such as loading time and loading frequency, into a log file. As is apparent to those skilled in the art, the monitor 101 may be implemented in software. For example, the monitor can be designed as a daemon program which runs in background beginning from the operating system startup and resides in memory until the operating system shuts down.

The invoker 102 selects at least one of the most frequently-loaded dynamic libraries from the log file logged by the monitor 101 to load (the number of the loaded dynamic link libraries may be preset in a configuration file, for example 30). The invoker 102 runs only once right after the operating system starts up. As mentioned above, the dynamic link libraries of the most frequently used applications are often the most frequently loaded dynamic link libraries. Thus, the startup performance of the most frequently used applications which use the frequently used dynamic link libraries can be greatly improved, by pre-loading the dynamic link libraries.

In another aspect, a user's most frequently used applications often change. Therefore, the user's needs can not be well met if the invoker 102 just simply takes loading frequency as a condition and loads at least one dynamic link library with high frequency into memory. As an example, assume that user A often used applications B, C, D, and E in the past relatively long time frame M (e.g., 12 months), and thus the most frequently loaded dynamic link libraries during time frame M are dynamic link libraries a1.dll-a30.dll, which should be loaded upon startup of the applications B, C, D, and E. Let's assume that each of these dynamic link libraries has been loaded over 300 times till now. However, in a current relatively short time frame T (e.g., 2 months), the user A will frequently use a new application M for some reason, and will seldom use the applications B, C, D, and E, which were frequently used in the past. Herein, let's assume that the dynamic link libraries which will be loaded upon startup of the application M are b1.dll-b20.dll, and assume that these dynamic link libraries each will be loaded for about 100 times in time frame T. Obviously, in current time frame T, the user A wishes the application M to have a good startup performance, but does care much about the startup performance of the applications B, C, D, and E. In this case, if the invoker 102 only pre-loads the most frequently loaded (e.g. 30) dynamic link libraries into memory in the order of loading frequency, then dynamic link libraries a1.dll-a30.dll will be loaded while dynamic link libraries b1.dll-b20.dll will not be loaded upon startup of the system. Consequently, in this time frame T, the user A has to suffer from the poor startup performance when starting up the application B.

Accordingly, the pre-loading system of the present invention may be provided a configuration manager 103. The configuration manager 103 provides a user interface to the user, and receives preference information input by the user, for example, the preference time range and loading size of the dynamic link libraries, in order to filter the dynamic link libraries. Thus, the invoker 103 may use the received user preference information as a condition to filter the dynamic link libraries logged in the log files, and only pre-load those dynamic link libraries meeting the filtering condition. In the above example, the user may set the preference time range as current time frame T, and set the loading size as 30. Thus, the invoker 102 will load the top 30 of the most frequently used dynamic link libraries in the time frame T upon startup of the system, which ensures the pre-loading of the dynamic link libraries required for startup of the application M. Accordingly, the application M can be quickly started up when the user wants to use it. The above description is only for exemplary purposes only, and the configuration manager 103 can be applied in a flexible manner. The configuration manager 103 can be designed such that the user can input various preference information according to the demands, so that the system of the invention can adaptively pre-load crucial dynamic link libraries in response to the variation of the most frequently used applications. Also, after receiving new loading preference input by the user, the configuration manager 103 updates the configuration files holding the loading preference information under its maintenance. Further, for convenience, the preference information held in the configuration files may have default settings set by the system.

Figure 2:
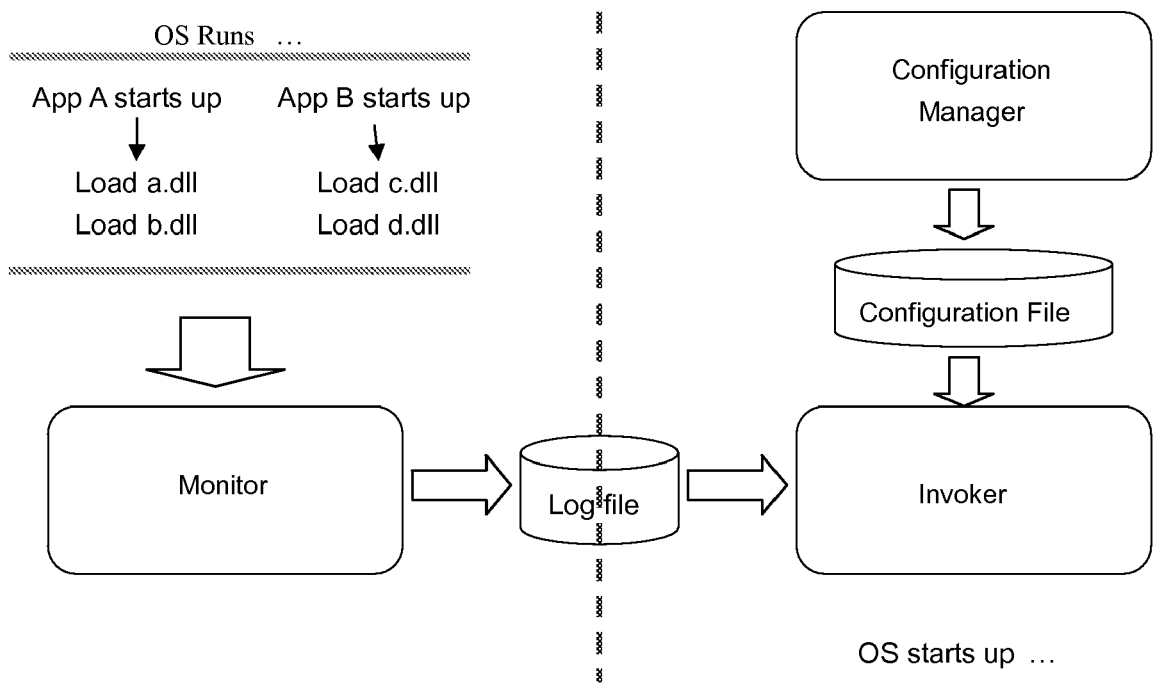
FIG. 2 is a block diagram illustrating a pre-loading process performed by the pre-loading system according to an embodiment of the present invention.

FIG. 2 is a block diagram illustrating a pre-loading process performed by the pre-loading system according to an embodiment of the present invention.

The pre-loading process will be described herein below with reference to FIG. 2.

As shown in FIG. 2, the monitor 101 begins to run upon the startup of the operating system, monitors system-wide loading events of every dynamic link library during the running of the operating system, and logs related information, such as loading time and loading frequency, into a log file. Upon the next startup of the operating system, the invoker 102 reads the configuration files maintained by the configuration manager 103 to acquire loading preference information, filters the dynamic link libraries in the log file with the loading preference information, and loads the plurality of filtered dynamic link libraries in sequence. The user may start the configuration manager 103 whenever the user wants to change loading preference. The configuration manager 103 provides a user interface to the user, receives preference information input by the user, and updates the configuration files under its maintenance with the received preference information. The configuration management of the configuration manager 103 is optional, because there is a default setting set by the system without user's manual configurations.

Figure 3:
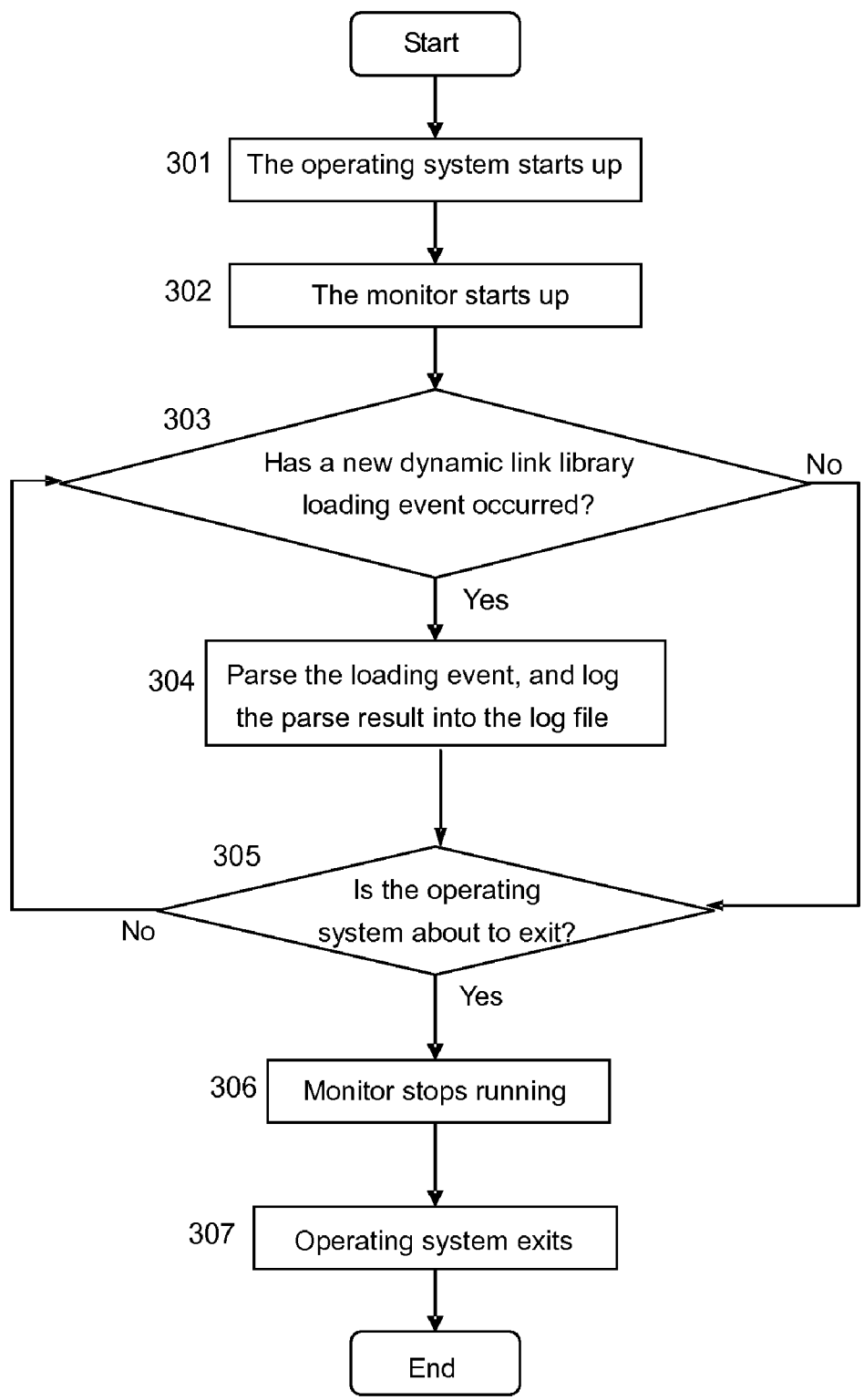
FIG. 3 is a detailed flowchart illustrating a monitoring process performed by the monitor of FIG. 1.

FIG. 3 is a detailed flowchart illustrating a monitoring process performed by the monitor of FIG. 1. This process will be described herein below with reference to FIG. 3.

As shown in FIG. 3, in step S301, the operating system starts up. Then in step S302, the monitor 101 starts up. In step S303, the monitor 101 determines whether there is a new dynamic link library loading request generated due to the startup of applications. If dynamic link libraries are to be loaded, in step S304, in response to the new dynamic link library loading event, the monitor 101 parses the event, and logs the dynamic link library name, loading time, loading frequency, etc., to a log file as a parse result. After performing the processing of step S304, the process flow proceeds to step S305, wherein the monitor 101 determines whether the operating system is about to exit. On the other hand, if the monitor 101 determines there is no dynamic link library loading request in step S303, the flow proceeds to step S305 directly. If it is determined that the operating system is about to exit in step S305, the monitor 101 automatically stops running in step S306, and then the operating system exits in step S307. If, however, it is determined in step S305 that the operating system is not exiting, the process flow returns to step S303, and continues to determine whether a dynamic link library loading request has occurred.

Figure 4:
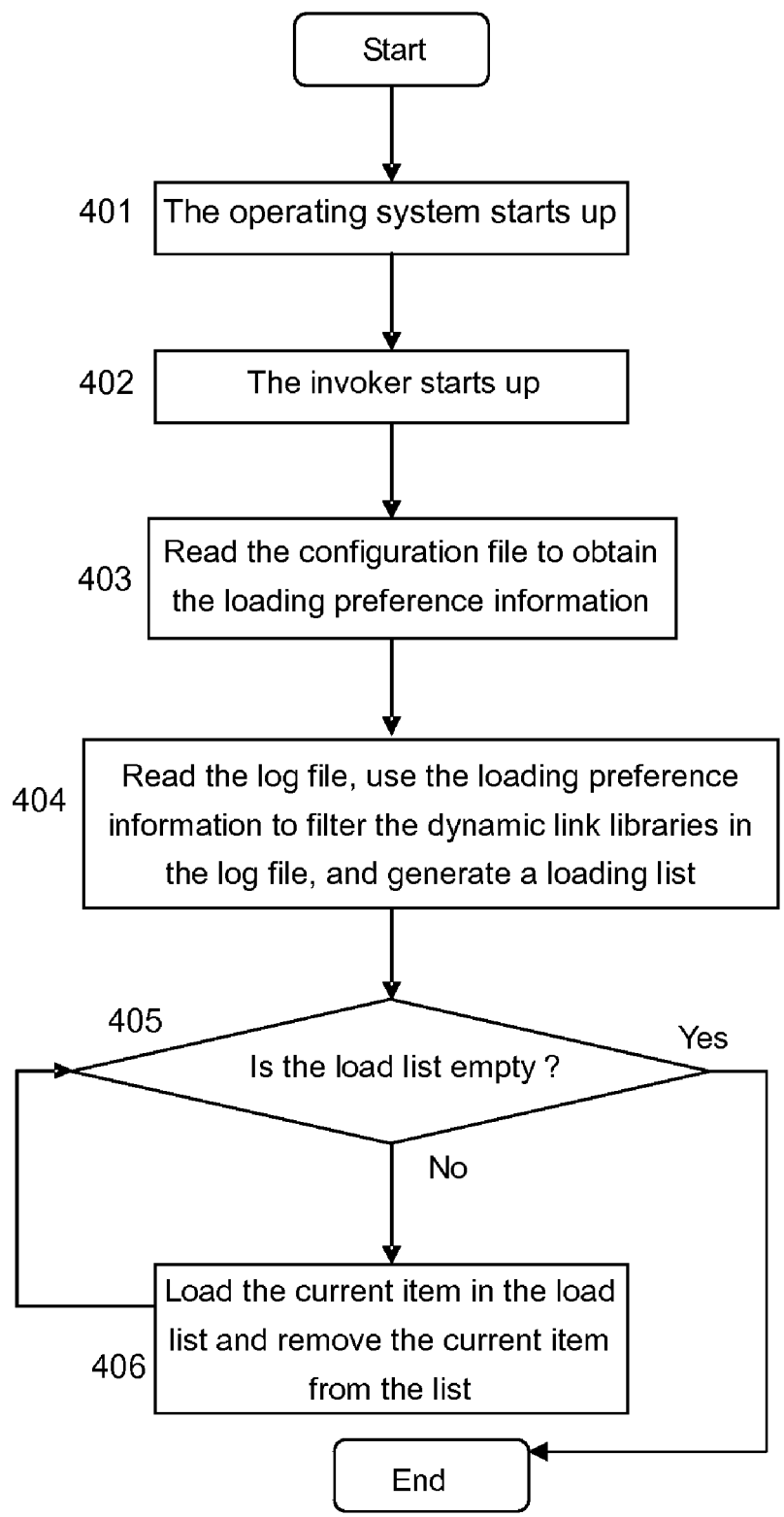
FIG. 4 is a flowchart illustrating a process of pre-loading the most frequently loaded dynamic link libraries by the invoker of FIG. 1.

FIG. 4 is a flowchart illustrating a process of pre-loading the most frequently loaded dynamic link libraries by the invoker of FIG. 1. This process will be described herein below with reference to FIG. 4.

As shown in FIG. 4, in step S401, the operating system starts up. Then in step S402, the invoker 102 starts up. In step S403, the invoker 102 reads the configuration file maintained by the configuration manager 103 to obtain the loading preference information. In step S404, the invoker 102 reads the log file, filters the dynamic link libraries in the log file using the obtained loading preference information, and generates a loading list for the filtered dynamic link libraries. In step S405, the invoker 102 determines whether the generated loading list is empty. If the list is not empty, the invoker 102 loads the current item in the list in step S406, and removes the current item from the list. The invoker 102 repeats steps 405 and 406, until the loading list is empty.

Figure 5:
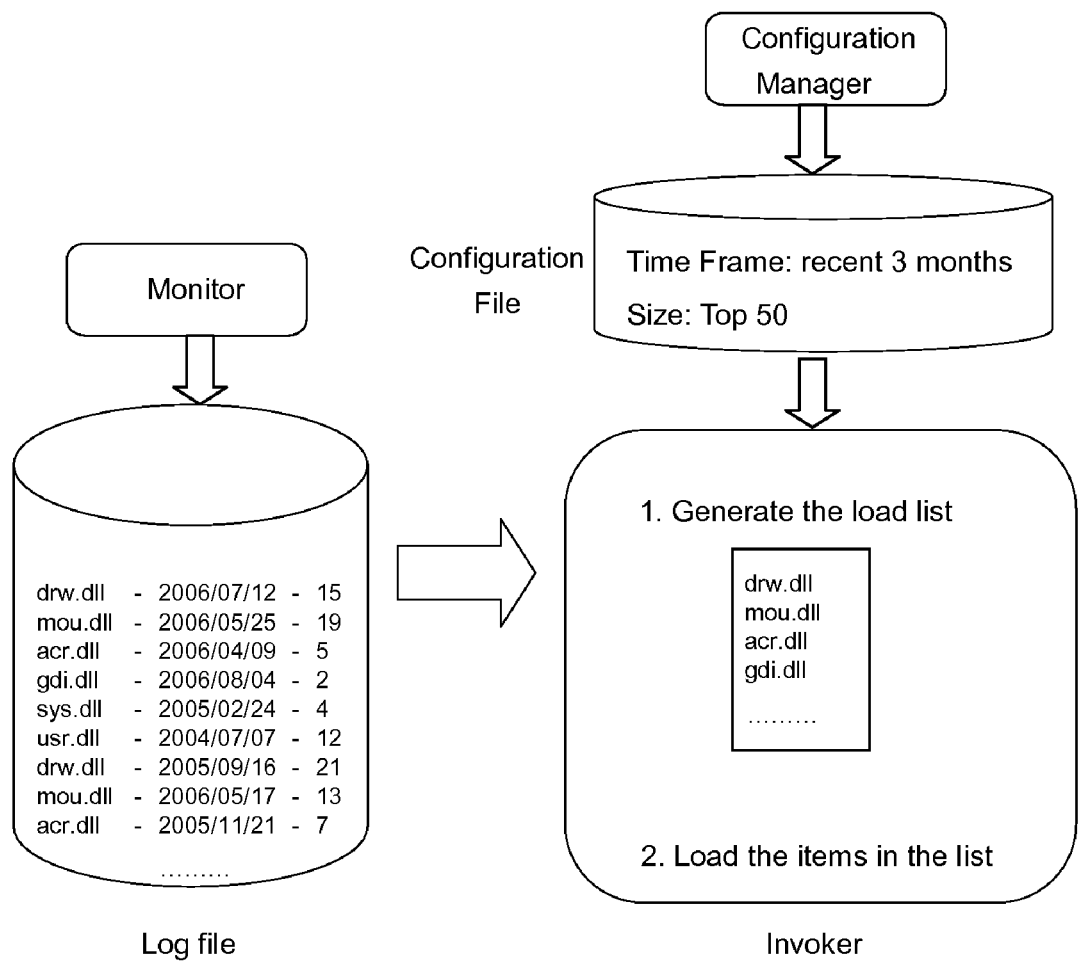
FIG. 5 illustrates a particular example of applying the dynamic link libraries pre-loading system according to an embodiment of the present invention.

FIG. 5 illustrates a particular example of applying the dynamic link libraries pre-loading system according to an embodiment of the present invention. The monitor monitors the system-wide loading events of every dynamic link library during the running of the operating system, and logs the information relating to the loading events into a log file. As shown in FIG. 5, for example, the monitor logs the loading frequency of every dynamic link library in a day unit (e.g., drw.dll was loaded a total of 15 times on Jul. 12, 2006). Of course, the monitor may log using a smaller time unit, so that the occurring time of every loading event of every dynamic link library can be accurately logged. The invoker reads the loading preference information saved in the configuration file which is maintained by the configuration manager, such as, time frame: recent 3 months; and loading size: top 50 dynamic link libraries with high loading frequency. Then, the invoker uses the preference information to filter the dynamic link libraries in the log file, creates a loading list for the filtered dynamic link libraries, and loads every dynamic link library in the list in sequence.

The present invention is described above with detailed embodiments. According to the present invention, when the user's favorite applications change, they can be reflected in the log file. Since the invoker loads dynamic link libraries selected from the log file, which is generated and maintained by the monitor component, this invention can automatically adapt to changes in the user's favorite applications, and the whole process is transparent to the user. Furthermore, because the present invention does not use the "service" feature of the operating system, the user doesn't need to maintain a long list of "service" programs and worry about which one to be unregistered when he finds a system startup performance downgrade. In addition, there is no need to register many "service" programs except those real "server" programs, which can save a large amount of runtime system resources. Accordingly, this invention can greatly improve the startup performance of the most frequently used applications in the system, while inherently getting rid of the drawbacks of the "service" mechanism.

Although a few embodiments of the present invention have been shown and described, it will be appreciated by those skilled in the art that changes may be made to these embodiments without departing the principles and sprite of the invention, the scope of which is defined in the claims and their equivalents.

What is claimed is:

1. A system for adaptively loading frequently loaded dynamic link libraries, comprising:
   a monitor for monitoring loading events of dynamic link libraries while an operating system is running, and for logging a name and related loading information of each dynamic link library into a log file in response to the loading events, wherein, for each dynamic link library, the loading information includes a loading frequency of the dynamic link library and a time of each loading of the dynamic link library;
   an invoker for automatically loading at least one of the most frequently loaded dynamic link libraries logged in the log file upon a subsequent startup of the operating system; and
   a configuration manager for maintaining a configuration file in which loading preference information is saved, wherein the loading preference information includes a selectable loading time frame and a loading size comprising a selectable number of the most frequently loaded dynamic link libraries that were loaded during the selectable loading time frame.

2. The system according to claim 1, wherein the monitor runs in a background once the operating system starts up, until the operating system shuts down.

3. The system according to claim 1, wherein the invoker only runs once upon the startup of the operating system.

4. The system according to claim 1, wherein the configuration manager provides a user interface to receive new preference information input by a user, and updates the loading preference in the configuration file with the received new loading preference information.

5. The system according to claim 1, wherein the invoker reads the configuration file to obtain the loading preference information, uses the loading preference information to filter the dynamic link libraries in the log file, creates a loading list for the filtered dynamic link libraries, and loads each dynamic link library in the created loading list in sequence.

6. A method for adaptively loading frequently loaded dynamic link libraries, comprising:
   monitoring loading events of dynamic link libraries while an operating system is running;
   logging a name and related loading information of each dynamic link library into a log file in response to the loading events, wherein, for each dynamic link library, the loading information includes a loading frequency of the dynamic link library and a time of each loading of the dynamic link library;
   automatically loading at least one of the most frequently loaded dynamic link libraries logged in the log file upon a subsequent startup of the operating system; and
   maintaining a configuration file in which loading preference information is saved, wherein the loading preference information includes a selectable loading time frame and a loading size comprising a selectable number of the most frequently loaded dynamic link libraries that were loaded during the selectable loading time frame.

7. The method according to claim 6, wherein the automatically loading is only performed once upon the startup of the operating system.

8. The method according to claim 6, further comprising:
   receiving preference information input by a user in response to a user request, and
   updating the configuration file in which the loading preference information is saved.

9. The method according to claim 8, wherein the automatically loading further comprises:

reading the configuration file to obtain the loading preference information;
filtering the dynamic link libraries in the log file using the loading preference information;
creating a loading list for the filtered dynamic link libraries; and
loading the dynamic link libraries in the list in sequence.

* * * * *